United States Patent
Gibeau et al.

(10) Patent No.: US 10,860,197 B1
(45) Date of Patent: Dec. 8, 2020

(54) MULTI-SOURCE TRACE PROCESSING IN COMPUTING SYSTEMS

(71) Applicant: Microsoft Technology Licensing, LLC, Redmond, WA (US)

(72) Inventors: Tristan Charles Gibeau, Issaquah, WA (US); Kaiyi Zhang, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/528,391

(22) Filed: Jul. 31, 2019

(51) Int. Cl.
  *G06F 3/048* (2013.01)
  *G06F 3/0484* (2013.01)

(52) U.S. Cl.
  CPC .................. *G06F 3/04847* (2013.01)

(58) Field of Classification Search
  CPC .................................................. G06F 3/04847
  See application file for complete search history.

(56) References Cited

U.S. PATENT DOCUMENTS

| | | | | |
|---|---|---|---|---|
| 5,132,938 A * | 7/1992 | Walters | ..................... | G01V 1/28 367/38 |
| 10,430,151 B1 * | 10/2019 | Robinson | ................ | G11B 27/10 |
| 10,592,694 B2 * | 3/2020 | Carasso | ................ | G06F 3/0481 |
| 2007/0250274 A1 * | 10/2007 | Volkov | ............... | G01N 21/6408 702/22 |
| 2007/0288526 A1 * | 12/2007 | Mankad | .............. | G06F 11/1662 |
| 2007/0294319 A1 * | 12/2007 | Mankad | .............. | G06F 11/1662 |
| 2012/0113824 A1 * | 5/2012 | Olsson | .................... | H04L 43/06 370/252 |
| 2012/0120078 A1 | 5/2012 | Hubbard | | |
| 2013/0033961 A1 * | 2/2013 | Burnstad | ................ | G01V 1/308 367/47 |
| 2013/0159780 A1 * | 6/2013 | Bedwell | .............. | G06F 11/3466 714/45 |
| 2017/0004067 A1 | 1/2017 | Lentz et al. | | |
| 2017/0082573 A1 * | 3/2017 | Vingerhoets | ....... | G01N 27/4163 |
| 2017/0085446 A1 | 3/2017 | Zhong et al. | | |
| 2020/0182995 A1 * | 6/2020 | Zeng | ..................... | G01S 13/723 |
| 2020/0191913 A1 * | 6/2020 | Zhang | ..................... | G01S 7/006 |
| 2020/0191943 A1 * | 6/2020 | Wu | ........................ | G01S 13/726 |

OTHER PUBLICATIONS

"International Search Report and Written Opinion Issued in PCT Application No. PCT/US20/036223", dated Oct. 2, 2020, 12 Pages.

* cited by examiner

*Primary Examiner* — David E Choi
(74) *Attorney, Agent, or Firm* — Liang IP, PLLC (57) ABSTRACT

Techniques for processing multi-source traces from computing systems are disclosed. One example technique includes receiving a user command to align a first event from a first trace to a second event from a second trace. The first trace has a first anchor event temporally aligned with a second anchor event of the second trace. The technique also includes setting a time in a timestamp of the first anchor event as a base time, calculating first and second differences between times in timestamps of the first and second events relative to the base time, respectively, deriving a ratio between the first difference and the second difference, and scaling time intervals between adjacent events of the second trace using the derived ratio such that the second event from the second trace is temporally aligned with the first event of the first trace while the first and second anchor events remain temporally aligned.

20 Claims, 7 Drawing Sheets

MULTI-SOURCE TRACE PROCESSING IN COMPUTING SYSTEMS

BACKGROUND

In computing, software tracing generally refers to a type of data logging to record certain information about execution and/or performance of software applications or processes. For instance, exceptions thrown during execution of a software application can be logged as a data point or "event" in a trace with a timestamp. Such a trace can also include additional logged events of other exceptions, process initiations, execution interruptions, process completions, or other types of occurrences, outcomes, or incidents encountered during execution of the software application. The recorded trace can be useful for developing and/or troubleshooting software applications. For instance, software developers can analyze exceptions or other events in a trace to identify potential software bugs that impact execution and/or performance of software applications.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

To aid analysis of a recorded trace, software developers can often visualize a sequence of events in a trace via a graphical user interface. For instance, various types of events in a recorded trace from a data source can be displayed on a graphical user interface as represented by various graphical interface elements of different shapes (e.g., dots, diamonds, stars, triangles, squares, etc.), colors (e.g., red, green, blue, etc.), sizes (e.g., large, medium, small, etc.), or otherwise distinguishable from one another. The various graphical interface elements are typically arranged in a chronological order according to timestamps along an axis (e.g., a horizontal axis) representing elapsed time. Such a graphical user interface is often referred to as a "timeline" of the events in the recorded trace.

Though timelines can be useful to aid analysis of a recorded trace from a single source, certain timelines can be rather limited when visualizing events from multiple data sources due to timekeeping differences. For instance, a computing system (e.g., a server) can execute suitable instructions to host a virtual machine. A first trace can be recorded from the virtual machine while a second trace is recorded from the server for monitoring various execution exceptions. Often, timekeeping of the server and the virtual machine can differ from each other. For example, the server and the virtual machine may have a different reference time (e.g., a starting timepoint), a different timekeeping interval (e.g., one second versus half a second), or a different clock speed (e.g., one clock runs faster than another). As such, timestamps generated on the server and the virtual machine for events in the recorded first and second traces often differ even when such events happen at the exact same moment on both the server and the virtual machine.

The difference in timekeeping can render visualizing events in traces from multiple sources rather difficult. For instance, a software developer may only visualize the first and second traces in separate first and second timelines. In order to correlate events in the first and second traces, the software developer may manually determine that certain events from the first trace are likely being correlated to some events in the second trace due to operations of the server and the virtual machine. For example, the first trace can include a first event with a first timestamp from the virtual machine indicating that network communication at the virtual machine has failed. The second trace can include a second event with a second timestamp from the server indicating that a Network Interface Card ("NIC") on the server has failed. Though the first and second events may have different timestamps, the software developer may correlate the two events and attribute the network communication failure at the virtual machine to the NIC failure at the server. Such manual correlation, however, can be cumbersome, time consuming, and difficult to perform by requiring in-depth knowledge of operations of the various data sources.

Several embodiments of the disclosed technology are directed to providing a visualization application configured to provide a graphical user interface that allows a user to visualize events from multiple data sources on a unified timeline. The following example is used to illustrate several aspects of the disclosed technology:

Data source A has following events:
EventX_a1→T=12, type=X
EventY_a7→T=16, type=Y
EventZ_a9→T=20, type=Z
Data source B has the following events:
EventY_b1→T=20, type=Y
EventZ_b7→T=22, type=Z
EventX_b9→T=23, type=X
Data source C has the following events:
EventY_c1→T=800, type=Y
EventY_c7→T=840, type=Y
EventY_c9→T=830, type=Y In certain implementations, the visualization application can be configured to display the foregoing example events as separate streams of events along a single timeline. For instance, the events from the various data sources can be represented as data streams by various interface elements according to corresponding timestamps horizontally, vertically, from left to right, from right to left, or in other suitable manners. As such, in the foregoing example, the data streams from data sources A, B, and C can be arranged generally parallel to one another and according to the same unified timeline.

As discussed above, due to timekeeping differences at the various data sources, timestamps of events from the data sources may not be suitably aligned with one another. In order to address such a difficulty, the visualization application can be configured to allow a user to align a first event of a first event type from a first data source to a second event of a second event type from a second data source. In some embodiments, the term "aligned" can refer to being naturally aligned, i.e., the first and second events occurred at the same moment in time. In other embodiments, the term "aligned" can also refer to being offset aligned, i.e., the first event occurred before or after a time when the second event occurred.

In certain implementations, the visualization application can be configured to allow a user to align one event from one data source to another from another data source. For example, the visualization application can be configured to detect a user selects and drags an interface element representing EventY_b1 from data source B to be aligned with EventX_a1 from data source A. In other examples, the visualization application can be configured to receive user input that selects the foregoing events and a command to align the selected events. In further examples, the visualization application can be configured to align the foregoing events automatically based on metadata of the events, align to nearest target event, or in other suitable manners.

In response to detect the alignment of events, the visualization application can be configured to maintain the displayed events of one data source (e.g., data source A) and translate timestamp data of another data source (e.g., data source B) to accommodate offsets of timestamps between data sources A and B such that EventX_a1 from data source A and EventY_b1 from data source B are aligned. In the foregoing example, translation ($T^1$) for data source B can be calculated as adding a delta or offset between the timestamps of the event pair as $T^1$=t−8. Such a translation can be applied repeatedly to provide a "live" update of the displayed events while alignment operation is in progress, i.e., events displayed from data source B can use a translation based on a current drag point relative to those of the data source A. As a result, in this example, all displayed data points from source B have the translation applied:

EventY_b1→t=12 (was 20)
EventZ_b7→t=14 (was 22)
EventX_b9→t=15 (was 23)

In the foregoing example, events of all event types from data source B are adjusted by the applied first translation. In other examples, at least some of the events of certain event types may not be adjusted or adjusted in other suitable ways. In further examples, the translation ($T^1$) can be cached and applied only to certain events from data source B that are being displayed. Translation of timestamps of events from data source B not currently displayed can be delayed until needed. Though the foregoing description is directed to applying a single translation to timestamps of events in data source B, in other implementations, a composite transformation of multiple translations can be applied, as discussed in more detail below.

Upon aligning EventX_a1 and EventY_b1, the visualization application can also be configured to align additional events from data sources A and B by applying additional translations. For example, the visualization application can be configured to detect another user input that EventY_a7 and EventZ_b7 are to be aligned also on the unified timeline. The visualization application can be configured to align the foregoing events without undo the already aligned pair (EventX_a1 and EventY_b1), which can be "locked" as indicated by a further user input, by default, or in other suitable manners.

In response to detect the user input to align EventY_a7 and EventZ_b7, the visualization application can be configured to calculate and apply a second translation for timestamps of events in data source B to accommodate differences in clock speed between data source A and data source B. As a result, a clock speed of data source B can appear to be stretched or compressed relative to that of data source A. In the foregoing example, the new translation can be logically applied after the application of the initial transformation $T^1$ to determine a ratio of elapsed time from the locked pair (EventX_a1 and EventY_b1) and the pair being currently aligned, i.e., EventY_a7 and EventZ_b7, as follows:

$T_{base}$=12

Delta for source $A$==16−$T_{base}$==4

Delta for source $B$==14−$T_{base}$==2

Ratio==2:1

As such, based on the foregoing calculation, the visualization application can be configured to apply a second translation ($T^2$) to events in data source B, resulting in the following translations:

$$T^1 = t-8$$

$$T^2 = (t-T_{base})*2+T_{base}$$

In certain implementations, the visualization application can also be configured to combine the first and second translations into a composite transformation to be applied to the events in data source B as follows:

$$T^{1,2} = ((t-8)-12)*2+12$$

$$T^{1,2} = 2*(t-14)$$

Thus, after applying the second translation, the events from data sources A and B are as follows:

EventX_a1→T=12
EventY_a7→T=16
EventZ_a9→T=20
EventY_b1→T=12 (was 20)
EventZ_b7→T=16 (was 22)
EventX_b9→T=18 (was 23)

In additional implementations, the visualization application can be configured to group events from multiple data sources (e.g., data source A and B) into a group (e.g., Group G) and apply translation(s) to the entire group. For example, the visualization application can detect that two additional pairs (e.g., data source C and data source A) are to be aligned. The first alignment can be for aligning EventY_c1 to EventX_a1, which applies a transformation to A and B due to common membership in Group G. The second alignment can be for aligning EventY_c7 to EventZ_b7. Even though the second alignment is between data sources C and B, the same transformation is also applied to data source A because A is in group G with data source B. Thus, the resulting aligned pairs are as follows:

(EventX_a1, EventY_b1)
(EventY_a7, EventZ_b7)
(EventY_c1, EventX_a1)
(EventY_c7, EventZ_b7)

The additional transformations to achieve the foregoing alignments are as follows:

$$T^{1,2} = 2*(t-14) \rightarrow \text{applied to data source } B$$

$$T^{3,4} = 10*(t+68) \rightarrow \text{applied to data sources } A \text{ and } B \text{ in Group } G$$

$$T^3 = (t+788)$$

$$T^4 = (t-800)*10+800, \text{ when base}=800, \text{ ratio}=10$$

For data sources A and B, the combined transformations are as follows:

Data source $A$: $T^{3,4} = 10*(t+68)$

Data source $B$: $T^{1,4} = 20*(t+20)$

Resulting data points after $T^3$ are as follows:

EventX_a1→T=800 (was 12)
EventY_a7→T=804 (was 16)
EventZ_a9→T=808 (was 20)
EventY_b1→T=800 (was 20)
EventZ_b7→T=804 (was 22)
EventX_b9→T=806 (was 23)
EventY_c1→T=800
EventY_c7→T=840
EventY_c9→T=830

Resulting data points after $T^4$:
EventX_a1→T=800 (was 12)
EventY_a7→T=840 (was 16)
EventZ_a9→T=880 (was 20)
EventY_b1→T=800 (was 20)
EventZ_b7→T=840 (was 22)
EventX_b9→T=860 (was 23)
EventY_c1→T=800
EventY_c7→T=840
EventY_c9→T=830

As such, events from data sources A, B, and C can be aligned to provide a visualization of sequences and/or other features of events from the different data sources.

Though the foregoing translations are directed to accommodating differences in clock speed between different data sources, in certain situations, the differences in clock speed are dynamic, i.e., change over time. As such, by applying a single translation for stretching or compressing clock of one data source may not adequately align events from the data sources. Several embodiments of the disclosed technology can address the foregoing difficulties by defining regions in which a difference in clock speed of data sources are relatively constant (e.g., varying by less than 5%, 10%, or other suitable values). Such regions can be defined automatically by calculating variation of clock speed, by receiving user input to select end points of the regions, or via other suitable ways.

Upon receiving the defined regions, the foregoing translations can be applied to each of the defined regions to align events in the different data sources. In further embodiments, the visualization application can also be configured to detect a "jump" or gap in timestamps (e.g., when daylight savings time is adjusted, a "leap second," etc.), and automatically or in response to user input, adjust an offset applied to timestamps of a data source. In yet further embodiments, instead of or in lieu of applying a linear ratio between differences in clock speed, the visualization application can also be configured to apply quadratic, sinusoidal, and/or other suitable types of non-linear ratio adjustments.

Several embodiments of the disclosed technology can thus enable a user to efficiently visualize and explore events in traces from different data sources. By compensating for offsets, differences in clock speeds, and/or other timekeeping differences among multiple data sources, events can be aligned to allow a user to visualize sequences of events occurred at different locations. For instance, in the example above with respect to the server and virtual machine, events of network communication failure on the virtual machine and the NIC failure on the server can be aligned in the visualization application such that a software developer can easily determine a sequence of events to facilitate efficient debugging and/or troubleshooting of the server and/or the virtual machine.

DETAILED DESCRIPTION

Certain embodiments of systems, devices, components, modules, routines, data structures, and processes for certificate management in segregated networks are described below. In the following description, specific details of components are included to provide a thorough understanding of certain embodiments of the disclosed technology. A person skilled in the relevant art will also understand that the technology can have additional embodiments. The technology can also be practiced without several of the details of the embodiments described below with reference to FIGS. 1-5.

As used herein, the term "trace" generally refers to a collection of data logged to record certain information about execution and/or performance of software applications or processes. For instance, exceptions thrown during execution of a software application can be logged as a data point or "event" in a trace with a corresponding timestamp. Such traces can also include additional logged events of other exceptions, process initiations, execution interruptions, process completions, or other types of occurrences, outcomes, or incidents encountered during execution of the software application. In certain implementations, a trace can be contained in a file of digital data. In other implementations, a trace can be contained multiple files, as a continuous "live" stream, or in other suitable formats.

Also used herein, an "event" generally refers to an occurrence, outcome, or incident encountered during execution of a software application, process or performance of a software service, hardware interacting with software middleware. Example events can include exceptions or errors encountered during execution of a software application, a process initiation, an execution interruption, a process completion, or other suitable types of incidents. Events can be detected by a computing system using various process monitors, sensors, etc. For example, a hypervisor on a server hosting a virtual machine can be configured to log errors encountered by the virtual machine as well as other events occurring at the server.

Further used herein, to "align" or "temporally align" generally refers to two or more events appear to occur at approximately the same time (e.g., within 0.1 millisecond) along a timeline on a graphical user interface. In certain situations, two or more events can be "naturally aligned" by appear to occur at approximately the same time. In other situations, two or more events can be "offset aligned" by applying a determined or desired offset between corresponding times of the two or more events. For example, a first event can be outputted on a graphical user interface as occurring a desired offset (e.g., 20 milliseconds) before or after a second event.

A "timestamp" generally refers to a sequence of characters and/or numbers that encode information identifying when a certain event occurred. For example, computer files can have timestamps that indicate when a file was created or last modified. In another example, a digital camera can add timestamps to pictures taken with the digital camera to record date and time the pictures were taken. Example time stamps can encode a date, a time, a weekday, a standard time, a number of days, weeks, or months since beginning of a year, or other suitable information. In certain implementations, a timestamp can be "absolute" by containing an elapsed time from a reference timepoint (e.g., time zero). In other implementations, a timestamp can be relative by containing a time without specifying a reference timepoint or the unit of time per timestamp increment. The following is a set of example timestamps:

Wed 01-01-2009 6:00
2005-10-30 T 10:45 UTC
2007-11-09 T 11:20 UTC
Sat July 23 02:16:57 2005
1256953732 (Unix time)
(1969-07-21 T 02:56 UTC)—
07:38, 11 Dec. 2012 (UTC)
1985-102 T 10:15 UTC (year 1985, day 102=12 Apr. 1985)
1985-W15-5 T 10:15 UTC (year 1985, week 15, day 5=12 Apr. 1985)
20180203073000 (02/03/2018 7:30:00)

Also used herein, the term "timeline" generally refers to a graphical user interface representation of a list of events (e.g., from one or more traces) in a chronological order. A timeline can use a suitable scale (e.g., linear, logarithmic, etc.) representing time based on displayed subject and data. In certain implementations, a timeline can be represented graphically as a horizontal line with time extending from left to right. In other implementations, a timeline can also be represented graphically as a horizontal line with time extending from right to left, a vertical line with time extending from up to down, a vertical line with time extending from down to up, or in other suitable manners.

To aid analysis of traces, software developers can often visualize a sequence of events in a trace in a timeline via a graphical user interface. For instance, various types of events in a recorded trace from a data source can be displayed on a graphical user interface as represented by various graphical interface elements of different shapes, colors, sizes, or otherwise distinguishable from one another. The various graphical interface elements are typically arranged in a chronological order according to timestamps along the timeline. Based on the sequence, correlation, and/or other relationships of the various events on the timeline, software developers may debug and/or troubleshoot execution of applications or performance of computing services.

Though timelines can be useful to aid analysis of recorded traces from a single source, certain timelines can be rather limited when visualizing events from multiple data sources due to timekeeping differences. For instance, a computing system (e.g., a server) can execute suitable instructions to host a virtual machine. A first trace can be recorded from the virtual machine while a second trace is recorded from the server for monitoring various execution exceptions. Often, timekeeping of the server and the virtual machine can differ from each other by having a different reference time (e.g., a starting timepoint), a different timekeeping interval (e.g., one second versus half a second), or a different clock speed (e.g., one clock runs faster than another). The difference in timekeeping can render visualizing events in traces from multiple sources rather difficult. For instance, a software developer may only visualize the first and second traces in separate first and second timelines. In order to correlate events in the first and second traces, the software developer may manually determine that certain events from the first trace are likely being correlated to some events in the second trace due to operations of the server and the virtual machine.

Several embodiments of the disclosed technology are directed to providing a visualization application configured to provide a graphical user interface that allows a user to visualize events from multiple data sources on a unified timeline In certain implementations, the visualization application can be configured to detect user commands to align one or more events of one trace to another. In response, the visualization application can be configured to apply offset, time interval compression/expansion, regional adjustment, and/or other adjustment techniques such that events from different data sources can appear temporally aligned on a unified timeline to aid visualization of event sequences, correlations, etc., as described in more detail below with reference to FIGS. 1-5.

Figure 1:
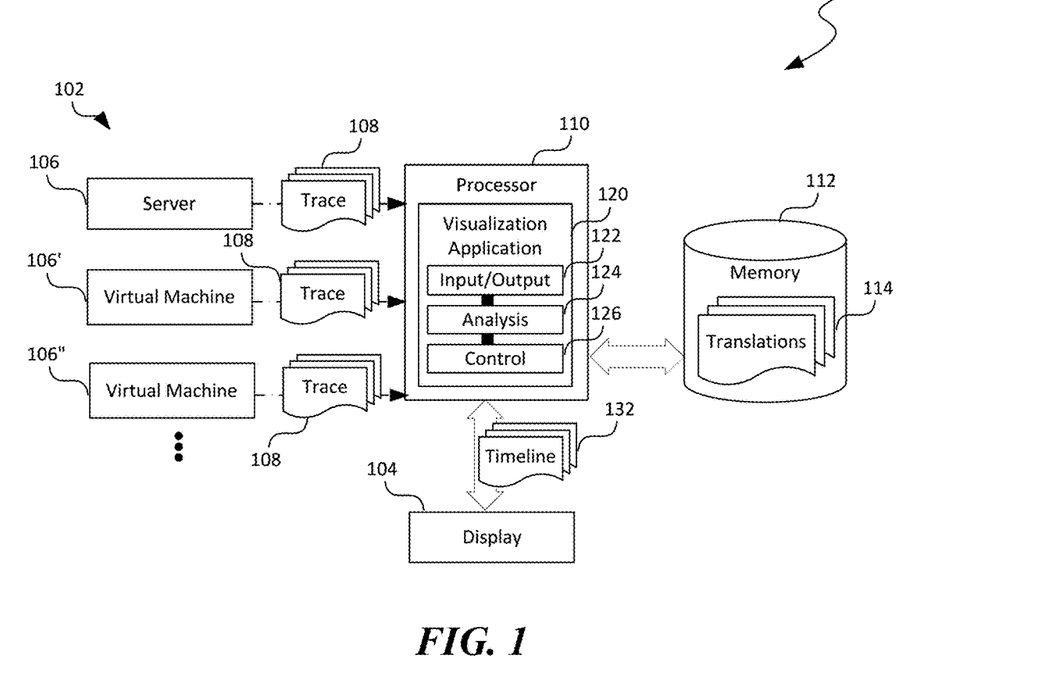
FIG. 1 is a schematic diagram illustrating various components of a computing device configured to process traces from multiple data sources in accordance with embodiments of the disclosed technology.

FIG. 1 is a schematic diagram illustrating various components of a computing system 100 configured to process traces from multiple data sources on the computing system 100 in accordance with embodiments of the disclosed technology. In FIG. 1 and in other Figures herein, individual software components, objects, classes, modules, and routines may be a computer program, procedure, or process written as source code in C, C++, C #, Java, and/or other suitable programming languages. A component may include, without limitation, one or more modules, objects, classes, routines, properties, processes, threads, executables, libraries, or other components. Components may be in source or binary form. Components may include aspects of source code before compilation (e.g., classes, properties, procedures, routines), compiled binary units (e.g., libraries, executables), or artifacts instantiated and used at runtime (e.g., objects, processes, threads).

Components within a system may take different forms within the system. As one example, a system comprising a first component, a second component and a third component can, without limitation, encompass a system that has the first component being a property in source code, the second component being a binary compiled library, and the third component being a thread created at runtime. The computer program, procedure, or process may be compiled into object, intermediate, or machine code and presented for execution by one or more processors of a personal computer, a network server, a laptop computer, a smartphone, and/or other suitable computing devices.

Equally, components may include hardware circuitry. A person of ordinary skill in the art would recognize that hardware may be considered fossilized software, and software may be considered liquefied hardware. As just one example, software instructions in a component may be burned to a Programmable Logic Array circuit or may be designed as a hardware circuit with appropriate integrated circuits. Equally, hardware may be emulated by software. Various implementations of source, intermediate, and/or object code and associated data may be stored in a computer memory that includes read-only memory, random-access memory, magnetic disk storage media, optical storage media, flash memory devices, and/or other suitable computer readable storage media excluding propagated signals.

As shown in FIG. 1, the computing system 100 can include a processor 110, a memory 112, and a display 104 operatively coupled to one another. The memory 112 can include records of cached translations 114. The processor 110 can execute suitable instructions to provide a visualization application 120 configured to facilitate visualizing traces 108 from multiple data sources 102. For example, in the illustrated embodiment, the data sources 102 include a server 106 and two virtual machines 106' hosted on the server 106. In other examples, the data sources 102 can include additional servers, virtual machines, hardware/software thereof, and/or other suitable types of data sources. In other embodiments, the computing system 100 can include additional and/or different components, such as network interface cards, graphics processing units, etc.

As shown in FIG. 1, the visualization application 120 can include an input/output component 122, an analysis component 124, and a control component 126 operatively coupled to one another. The foregoing components of the visualization application 120 can cooperate to provide a visualization of the traces 108 from different data sources 102 as a unified timeline on the display 104. Though particular components of the visualization application 120 are shown in FIG. 1, in other embodiments, the visualization application 120 can also include network, output, and/or other suitable types of components. In further embodiments, various configurations of visualizing the traces 108 can also be stored and applied to additional traces 108 having similar event types programmatically, such as via an Application Programming Interface ("API").

The input/output component 122 can be configured to receive the various traces 108 from the different data sources 102. In certain implementations, the input/output component 122 can be configured to open files corresponding to the traces 108 from a network storage location, a local storage location, or from other suitable storage locations. The input/output component 122 can also be configured to output the opened files of the traces 108 as graphical representations on the display 104. One example of the outputted graphical representation is a timeline 132, as discussed in more detail below with reference to FIG. 2A.

The input/output component 122 can also be configured to detect user input to align events from traces recorded at different data sources 102. In one implementation, the input/output component 122 can be configured to detect a user input as a user drags and move one event from one trace 108 to a timepoint that approximates that of another event from another trace 108. In another implementation, the input/output component 122 can be configured detect a user input as a selection of two events from two different traces 108 and a command to align the two selected events. In further implementations, the input/output component 122 can detect the user input via menu items, icons, and/or other suitable facilities of the visualization application 120.

In response to detecting a user input to align a pair of events in the outputted timeline on the display 104, the input/output component 122 can be configured to forward the received user input, the selected events, and/or other suitable information to the analysis component for further processing. In one implementation, the analysis component 124 can be configured to calculate an offset of time between two events to be aligned according to corresponding timestamps of the two events. For example, an offset of 8 seconds can be derived when one event has a time of 12 while another has a time of 20 from the corresponding timestamps. As such, by applying the offset to a time of one of the events, the two events can be temporally aligned on the timeline. Such aligned events are referred to herein as "anchor events" for ease of description.

Upon determining the offset, the analysis component 124 can be configured to provide the offset to the control component 126 to apply the offset as a translation 114 to other events of one or more traces outputted on the display 104. For instance, the offset of 8 seconds from the example above can be applied to one of the two traces to generate new timestamps of events in one of the two traces while timestamps of the other trace remain unchanged. In certain implementations, the control component 126 can be configured to select one of the traces for applying the offset while maintain the other traces unchanged by default. In other implementations, the control component 126 can receive a user indication via the input/output component 122 regarding which one of the traces to maintain unchanged. In further implementations, the control component 126 can be configured to select one or more of the traces to apply the offset in other suitable manners. Upon applying the offset, the control component 126 can be configured to rearrange or refresh the outputted timeline 132 according to the new timestamps of at least one of the traces 108.

Upon aligning the anchor events in the timeline 132, the input/output component 122 can also be configured to detect another user input to align an additional pair of events from different data sources 102. Techniques for detecting another user input can be generally similar or different from those discussed above for detecting the initial user input. The input/output component 122 can then provide the detected user input to the analysis component 124 for processing. In turn, the analysis component 124 can be configured to calculate and derive another translation 114 to compress/expand time intervals of adjacent events in one of the two traces 108 such that the additional pair of events are aligned while maintaining the alignment of the anchor events. The analysis component 124 can then provide the derived translation 114 to the control component 126, which in turn applies the translation 114 to other events in the one of the traces 108 and updates the outputted timeline 132 on the display 104 accordingly.

Though the description above is directed to applying multiple translations 114 sequentially, in other implementations, the multiple translations 114 can be combined to generate a composite transformation before being applied to events of one of the traces. In further implementations, one or more of the translations 114 and/or composite transformation can be cached at the memory 112 for applying to additional events of the traces 108. As such, events of the traces 108 that are currently outputted in the display 104 may reflect the applied translations 114 or composite transformation while additional events not currently outputted in the display 104 do not have the translations 114 applied.

By applying the various translations 114 and/or composite transformation, the visualization application 120 can be configured to allow a user to align events from different data sources 102 for analyzing the traces 108. FIGS. 2A-2F are example graphical user interfaces 130 illustrating alignment of various events performed by the visualization application 120. In FIGS. 2A-2F, the following example traces 108 are used to illustrate several aspects of the disclosed technology:

Data source A (e.g., the server 106 in FIG. 1) has following events:
    EventX_a1→T=12, type=X (represented by circles 134a)
    EventY_a7→T=16, type=Y (represented by squares 134b)
    EventZ_a9→T=20, type=Z (represented by triangles 134c)

Figure 2A:
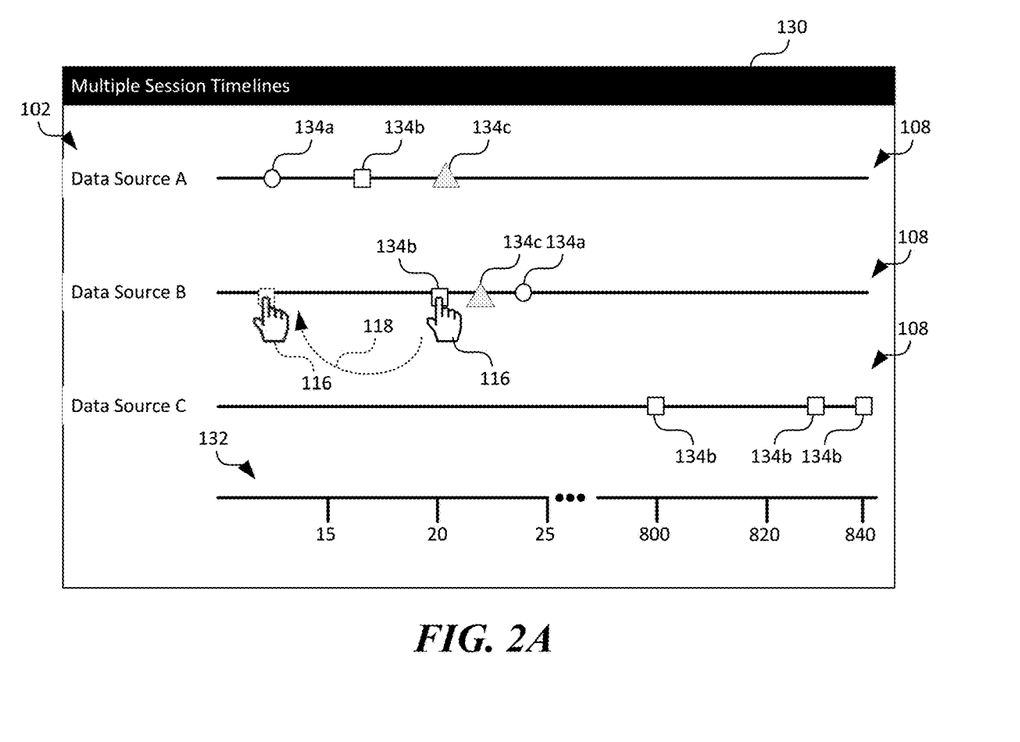
FIGS. 2A-2F are schematic diagrams illustrating an example graphical user interface of the computing device when processing traces from multiple data sources in accordance with embodiments of the disclosed technology.

Data source B (e.g., the virtual machine 106' in FIG. 1) has the following events:
    EventY_b1→T=20, type=Y
    EventZ_b7→T=22, type=Z
    EventX_b9→T=23, type=X Data source C (e.g., the virtual machine 106" in FIG. 1) has the following events:
    EventY_c1→T=800, type=Y
    EventY_c7→T=840, type=Y
    EventY_c9→T=830, type=Y As shown in FIG. 2A, the visualization application 120 (FIG. 1) can be configured to output the traces 108 as represented by various graphical interface elements such as circles 134a, squares 134b, and triangles 134c on a unified timeline 132. In the illustrated example, the events from the various data sources 102 can be represented as data streams according to corresponding timestamps horizontally from left to right. In other examples, the events can be represented as data streams horizontally from right to left, vertically from up to down, vertically from down to up, or in other suitable manners. As such, in the foregoing example, the data streams from data sources A, B, and C can be arranged generally parallel to one another and according to the same unified timeline 132.

The input/output component 122 (FIG. 1) of the visualization application 120 can be configured to detect a drag-and-align user input by detecting selection of an event (e.g., EventY_b1) from an initial position along the timeline 132 to another position, as indicated by the arrow 118, to be aligned with EventX_a1. In certain implementations, the input/output component 122 can be configured to determine alignment of two events when respective timepoints differ within a preset threshold (e.g., 0.1 second). In other implementations, the input/output component 122 can be configured to determine alignment of two events based on other suitable criteria. In other examples, the visualization application can be configured to receive user input that selects the foregoing events and a command to align the selected events. In further examples, the visualization application can be configured to align the foregoing events automatically based on metadata of the events, align to nearest target event, or in other suitable manners.

Figure 2B:
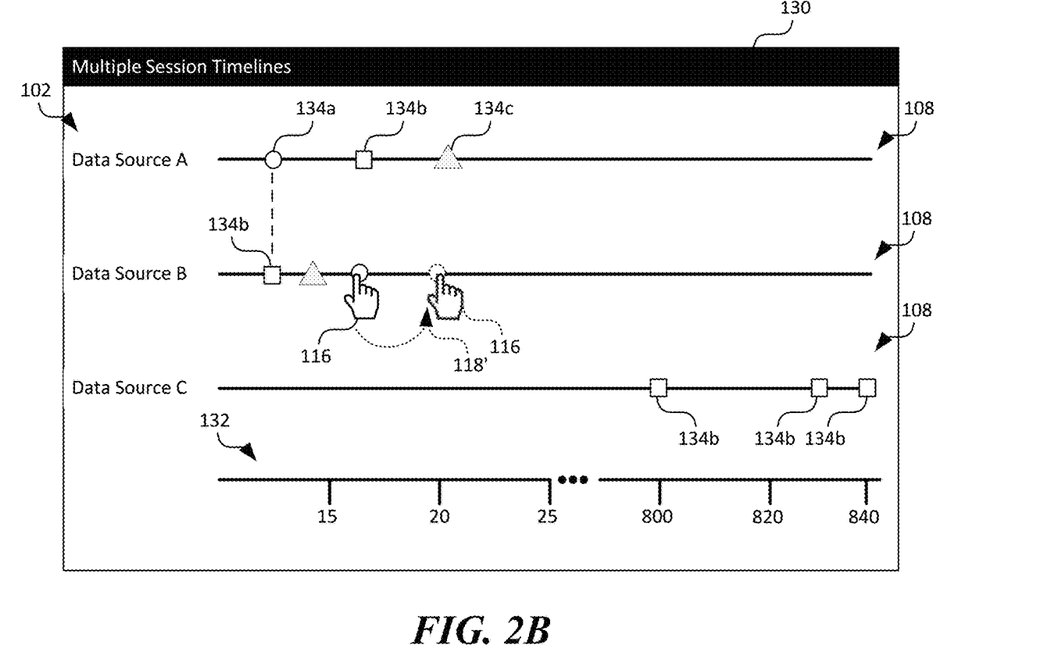

In response to detect the alignment of events, as shown in FIG. 2B, the visualization application 120 can be configured to maintain the displayed events of one data source (e.g., data source A) and translate timestamps of another data source (e.g., data source B) to accommodate offsets of timestamps between data sources A and B such that EventX_a1 from data source A and EventY_b1 from data source B are aligned. In the foregoing example, translation ($T^1$) for data source B can be calculated as adding a delta or offset between the timestamps of the event pair as $T^1=t-8$. Such a translation 114 (FIG. 1) can be applied repeatedly to provide a "live" update of the displayed events while alignment operation is in progress, i.e., events displayed from data source B can use a translation based on a current drag point relative to those of the data source A. In the foregoing example, all displayed data points from source B can have the following translation applied:

EventY_b1→t=12 (was 20)
EventZ_b7→t=14 (was 22)
EventX_b9→t=15 (was 23)

As shown in FIG. 2B, events of all event types from data source B are adjusted by the applied translation. In other examples, at least some of the events of certain event types may not be adjusted or adjusted in other suitable ways. In further examples, the translation ($T^1$) 114 can be cached and applied only to certain events from data source B that are being displayed. Translation of timestamps of events from data source B not currently displayed can be delayed until needed. Though the foregoing description is directed to applying a single translation to timestamps of events in data source B, in other implementations, a composite transformation of multiple translations can be applied, as discussed in more detail below.

Upon aligning EventX_a1 and EventY_b1, the visualization application 120 (FIG. 1) can also be configured to align additional events from data sources A and B by applying additional translations 114. For example, as shown in FIG. 2B, the input/output component 122 (FIG. 1) of the visualization application 120 can be configured to detect another user input that EventY_a7 and EventZ_b7 are to be aligned also on the unified timeline 132, as indicated by the arrow 118'. The visualization application 120 can be configured to align the foregoing events without undo the already aligned pair (EventX_a1 and EventY_b1), which can be "locked" as indicated by a further user input, by default, or in other suitable manners.

In response to detect the user input to align EventY_a7 and EventZ_b7, the visualization application 120 can be configured to calculate and apply a second translation 114 (FIG. 1) for timestamps of events in data source B to accommodate differences in clock speed between data source A and data source B. As a result, a clock speed of data source B and time intervals between adjacent events can appear to be stretched or compressed relative to that of data source A. In the foregoing example, the translation can be logically applied after the application of the initial transformation $T^1$ to determine a ratio of elapsed time from the locked pair (EventX_a1 and EventY_b1) and the pair being currently aligned, i.e., EventY_a7 and EventZ_b7, as follows:

$T_{base}=12$

Delta for source $A==16-T_{base}==4$

Delta for source $B==14-T_{base}==2$

Ratio==2:1

As such, based on the foregoing calculation, the visualization application 120 can be configured to apply a second translation ($T^2$) to events in data source B, resulting in the following translations:

$$T^1=t-8$$

$$T^2=(t-T_{base})*2+T_{base}$$

In certain implementations, the visualization application 120 can also be configured to combine the first and second translations into a composite transformation to be applied to the events in data source B as follows:

$$T^{1,2}=((t-8)-12)*2+12$$

$$T^{1,2}=2*(t-14)$$

Figure 2C:
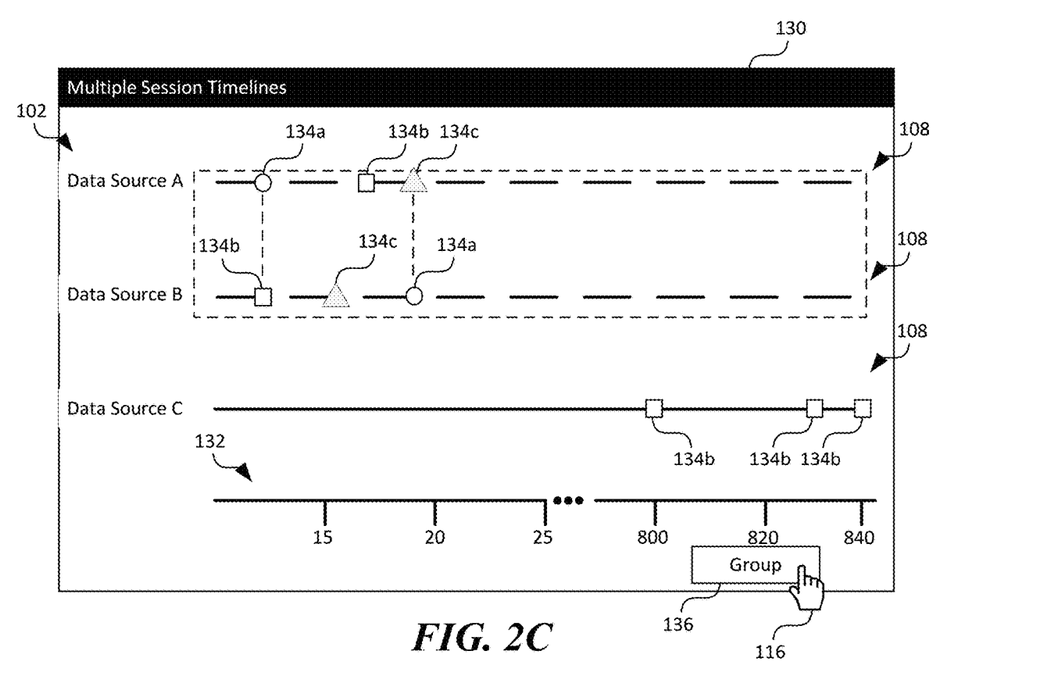

Thus, as shown in FIG. 2C, after applying the second translation or the composite transformation, the events from data sources A and B appear to be stretched or compressed along the timeline 132 and are as follows:

EventX_a1→T=12
EventY_a7→T=16
EventZ_a9→T=20
EventY_b1→T=12 (was 20)
EventZ_b7→T=16 (was 22)
EventX_b9→T=18 (was 23)

Also shown in FIG. 2C, in certain embodiments, two or more of the traces 108 can be grouped together as a group and apply translation(s) to the entire group. For example, the visualization application 120 can be configured to detect a user input to select data source A and data source B and a user command to group via pressing a button "Group" 136 on the graphical user interface 130. In other examples, the visualization application 120 can detect the user input and group the multiple data sources 102 in other suitable manners.

Figure 2D:
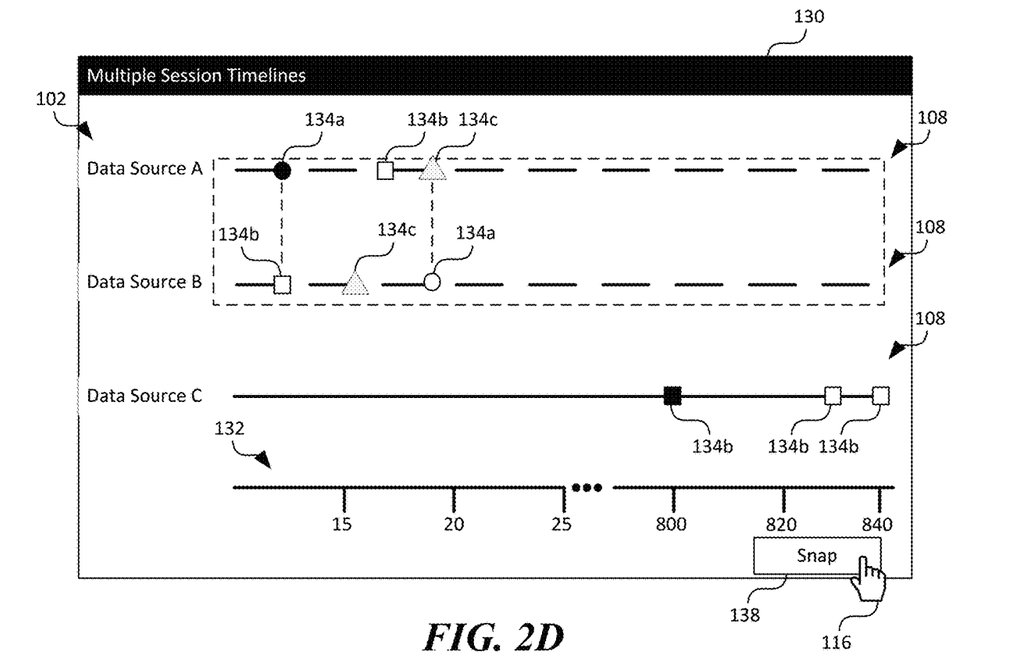

As shown in FIG. 2D, the visualization application 120 (FIG. 1) can be configured to detect that two additional pairs of events (e.g., from data source C and data source A and from data source C and data source B) are to be aligned. The first alignment can be for aligning EventY_c1 to EventX_a1. As shown in FIG. 2D, in the illustrated example, a user can select the foregoing events (shown in reverse contrast for clarity) and provide a user command by pressing a "Snap" button 138. In response to receiving the user input, the visualization application 120 can be configured to apply an offset translation to timestamps of events in both data sources A and B due to membership in a common group (as represented by the dashed lines). As a result, events from both data sources A and B can be shifted to the right of the timeline 132 with EventY_c1 aligned to EventX_a1, as shown in FIG. 2D.

Figure 2E:
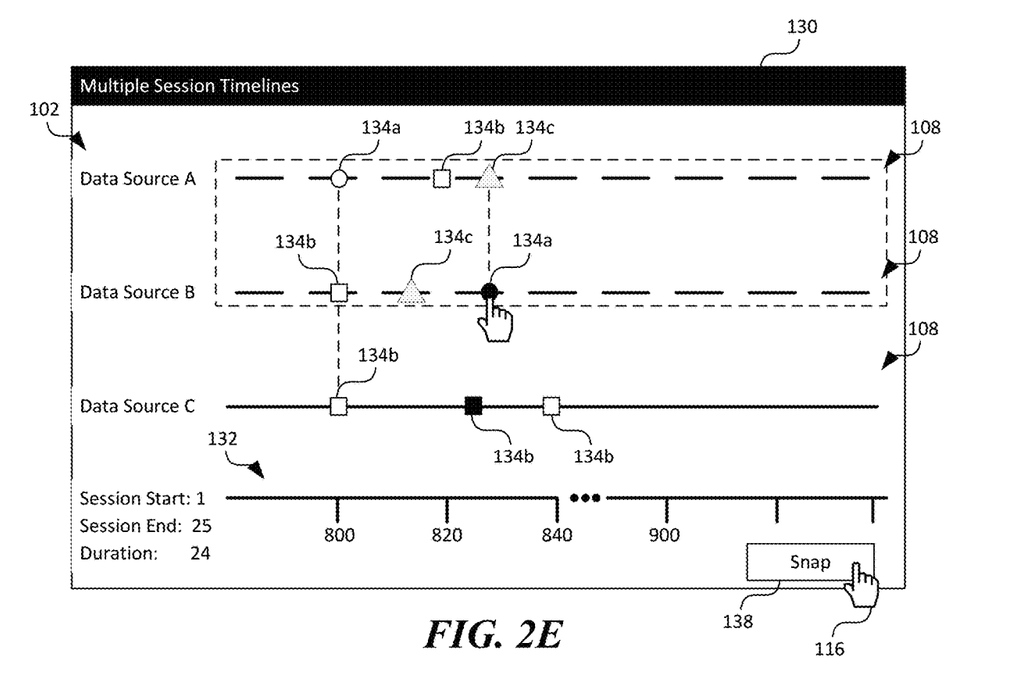

As shown in FIG. 2E, the second alignment can be for aligning EventY_c7 to EventZ_b7. In response to receiving the user input, the visualization application 120 can apply the technique described above with reference to FIG. 2B to stretch/compress time intervals between adjacent events in both data source B such that EventY_c7 to EventZ_b7. Even though the second alignment is between data sources C and B, the same transformation is also applied to data source A because events from data source A is in the same group as data source B. Thus, the resulting aligned pairs are as follows:

(EventX_a1, EventY_b1)
(EventY_a7, EventZ_b7)
(EventY_c1, EventX_a1)
(EventY_c7, EventZ_b7)

The additional transformations to achieve the foregoing alignments are as follows:

$$T^{1,2}=2*(t-14) \rightarrow \text{applied to data source } B$$

$$T^{3,4}=10*(t+68) \rightarrow \text{applied to data sources } A \text{ and } B \text{ in Group } G$$

$$T^3=(t+788)$$

$$T^4=(t-800)*10+800, \text{ when base}==800, \text{ratio}==10$$

For data sources A and B, the combined transformations are as follows:

Data source A: $T^{3,4}=10*(t+68)$

Data source B: $T^{1,4}=20*(t+20)$

Resulting data points after $T^3$ are as follows:
  EventX_a1→T=800 (was 12)
  EventY_a7→T=804 (was 16)
  EventZ_a9→T=808 (was 20)
  EventY_b1→T=800 (was 20)
  EventZ_b7→T=804 (was 22)
  EventX_b9→T=806 (was 23)
  EventY_c1→T=800
  EventY_c7→T=840
  EventY_c9→T=830

Resulting data points after $T^4$:
  EventX_a1→T=800 (was 12)
  EventY_a7→T=840 (was 16)
  EventZ_a9→T=880 (was 20)
  EventY_b1→T=800 (was 20)
  EventZ_b7→T=840 (was 22)
  EventX_b9→T=860 (was 23)
  EventY_c1→T=800
  EventY_c7→T=840
  EventY_c9→T=830

Figure 2F:
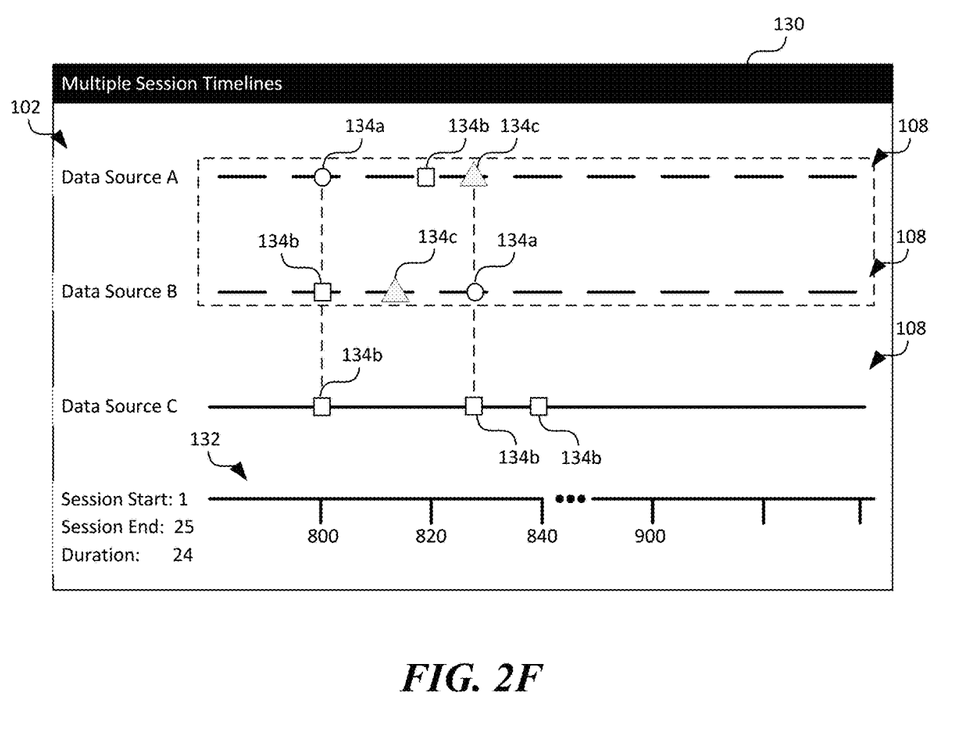

As such, as shown in FIG. 2F, events from data sources A, B, and C can be aligned to provide a visualization of sequences and/or other features of events from the different data sources 102.

Figure 3:
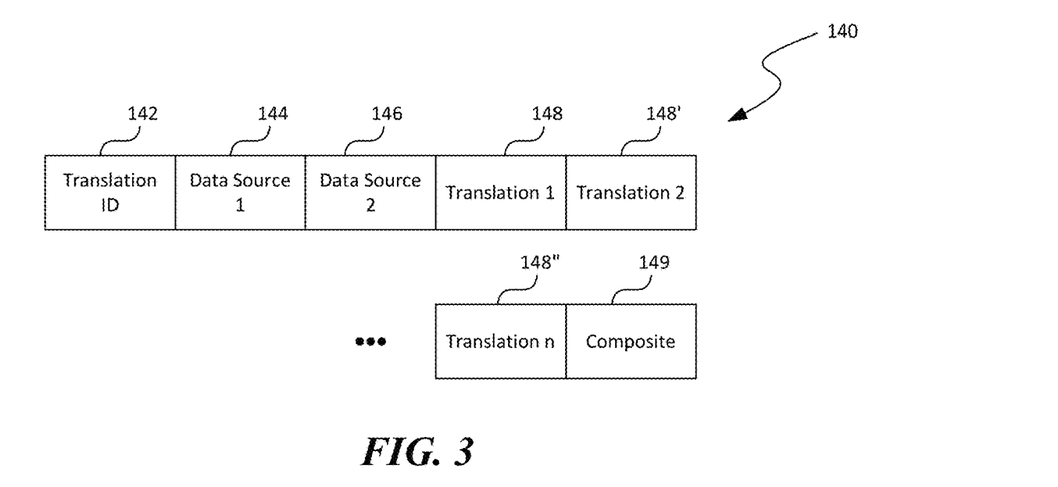
FIG. 3 is a schematic diagram illustrating an example data schema for a translation record in accordance with embodiments of the disclosed technology.

FIG. 3 is a schematic diagram illustrating an example data schema 140 for a translation record 114 in accordance with embodiments of the disclosed technology. As shown in FIG. 3, the data schema 140 can include a translation ID field 142, a data source 1 field 144, a data source 2 field 146, a translation 1 field 148, a translation 2 field 148', a translation n field 148", and a composite field 149. The translation ID field 142 can be configured to store an identification of a translation. The data source 1 and 2 fields 144 and 146 can be configured to store individual identifications of data sources. The translation fields 148 can be configured to store individual translations, such as translations of applying offsets, etc., to timestamps of events in different traces. The composite field 149 can be configured to store a composite transformation of translations 1, 2, . . . , n.

Figure 4A:
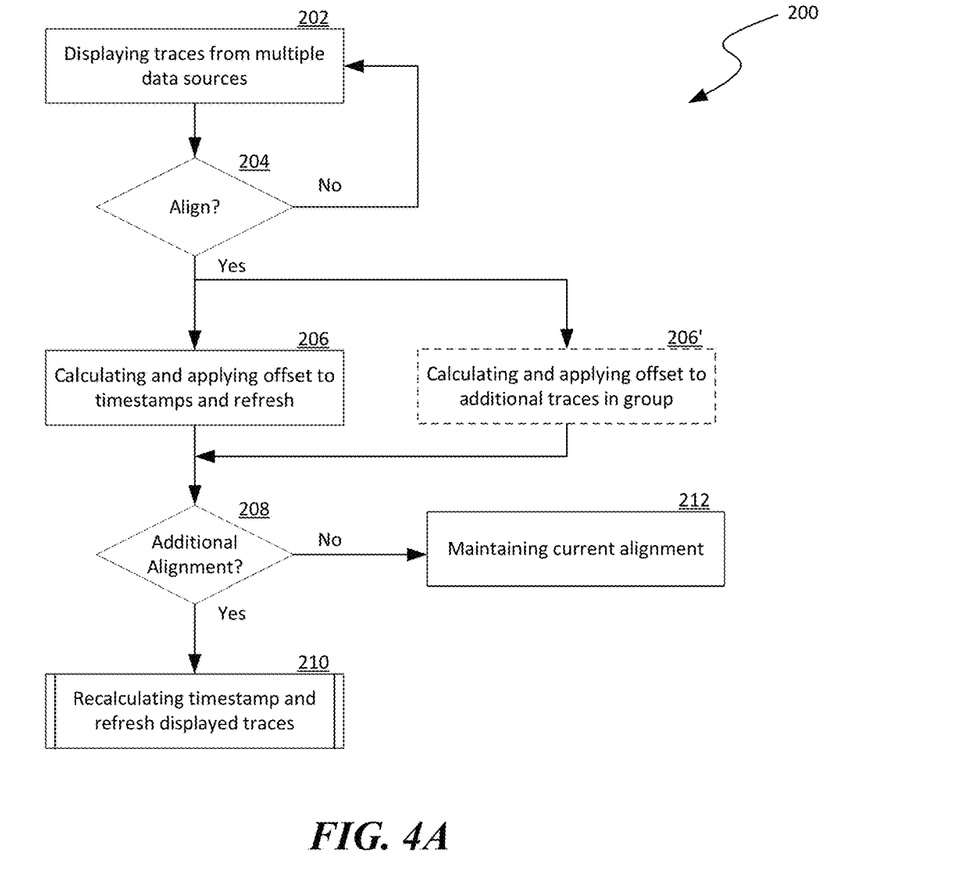
FIGS. 4A and 4B are flowcharts illustrating methods of multi-source trace processing in accordance with embodiments of the disclosed technology.
Figure 4B:
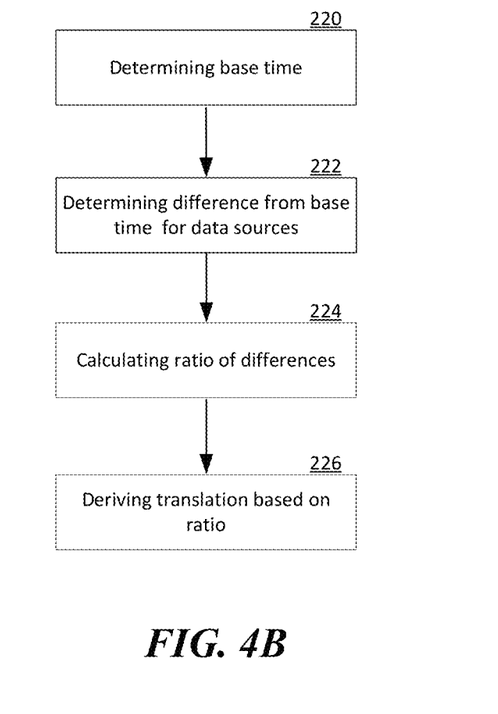

FIGS. 4A and 4B are flowcharts illustrating methods of multi-source trace processing in accordance with embodiments of the disclosed technology. Though the methods are described below in the context of the computing system 100 of FIG. 1, in other implementations, embodiments of the methods can be applied to other computing systems with additional and/or different components than those of the computing system 100.

As shown in FIG. 4A, a method 200 can include displaying traces from multiple data sources as graphical interface elements on a unified single timeline at stage 202. An example of such displayed traces is shown in FIG. 2A. The method 200 can then include a decision stage 204 to determine whether a user input to align anchor events is received. In response to determining that such a user input is not received, the method 200 reverts to displaying the traces at stage 202. Otherwise, the method 200 proceeds to calculating and applying an offset to timestamps of one of the traces and refresh the displayed traces at stage 206. Example operations of calculating and applying such an offset are described above with reference to FIGS. 1-2B. Optionally, the method 200 can also include calculating and applying such an offset to events of additional traces in a common group as the one of the traces, as described above with reference to FIGS. 2C and 2D.

The method 200 can then include another decision stage 208 to determine whether another user input is received to align additional pairs of events. In response to determining that no such user input is received, the method 200 proceeds to maintaining the current alignment of events at stage 212. Otherwise, the method 200 proceeds to recalculating timestamps to stretch/compress time intervals at stage 210. Example operations of recalculating such timestamps are described below with reference to FIG. 4B.

As shown in FIG. 4B, example operations for recalculating timestamps can include determining a base time at stage 220. The base time can be a time contained in a timestamp of an anchor event or other suitable times. The operations can then include determining differences from the base time at stage 222, calculating a ratio of the differences at stage 224, and deriving a translation based on the ratio at stage 226, as described above with reference to FIGS. 2A-2F.

Figure 5:
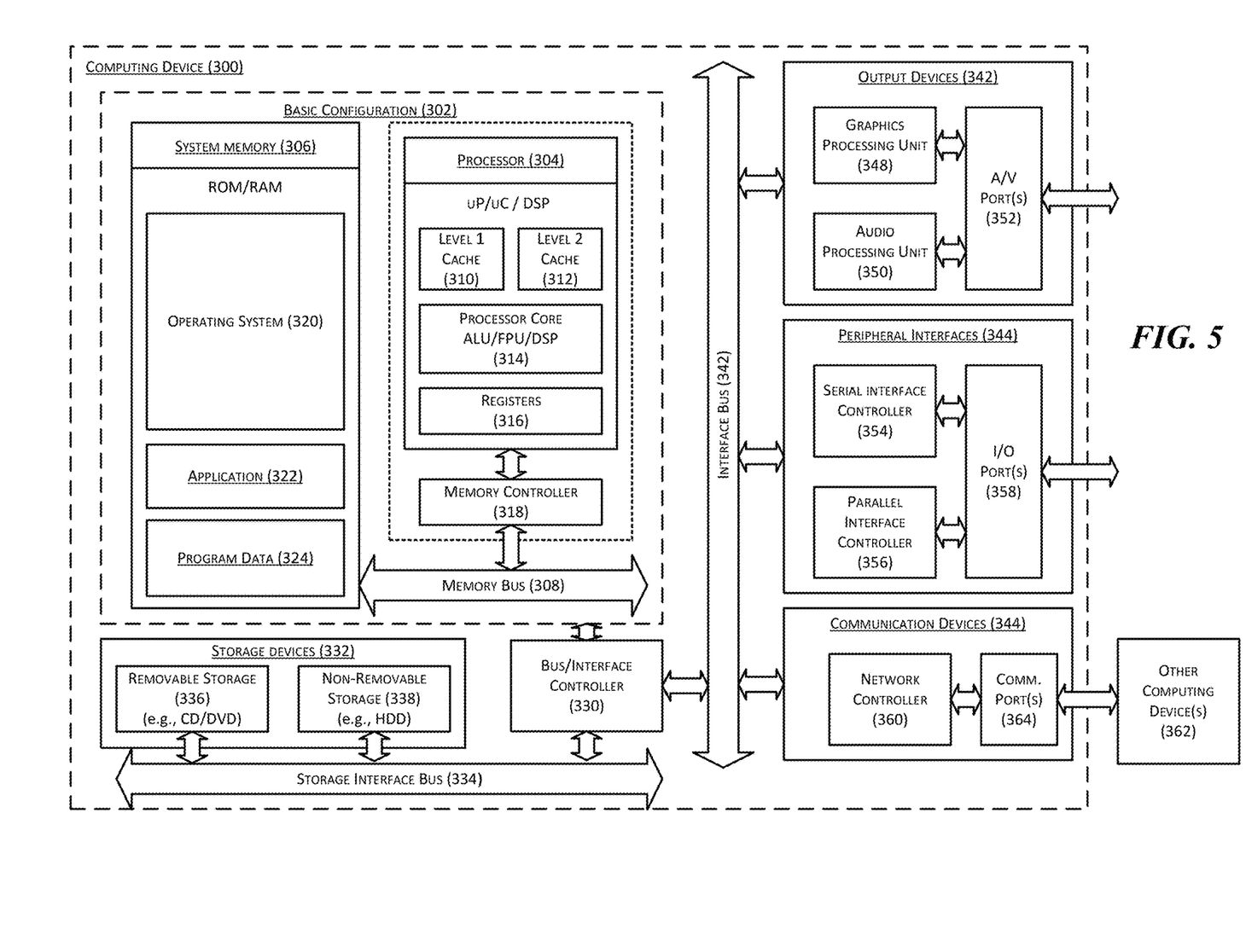
FIG. 5 is a computing device suitable for certain components of the computing system in FIGS. 1-2F.

FIG. 5 is a computing device 300 suitable for certain components of the computing system 100 in FIGS. 1-2F. For example, the computing device 300 can be suitable for the client devices 102, the administrative server 112, the certificate authority 114, or the execution servers 116 of FIGS. 1-2F. In a very basic configuration 302, the computing device 300 can include one or more processors 304 and a system memory 306. A memory bus 308 can be used for communicating between processor 304 and system memory 306.

Depending on the desired configuration, the processor 304 can be of any type including but not limited to a microprocessor (μP), a microcontroller (μC), a digital signal processor (DSP), or any combination thereof. The processor 304 can include one more level of caching, such as a level-one cache 310 and a level-two cache 312, a processor core 314, and registers 316. An example processor core 314 can include an arithmetic logic unit (ALU), a floating-point unit (FPU), a digital signal processing core (DSP Core), or any combination thereof. An example memory controller 318 can also be used with processor 304, or in some implementations memory controller 318 can be an internal part of processor 304.

Depending on the desired configuration, the system memory 306 can be of any type including but not limited to volatile memory (such as RAM), non-volatile memory (such as ROM, flash memory, etc.) or any combination thereof. The system memory 306 can include an operating system 320, one or more applications 322, and program data 324. This described basic configuration 302 is illustrated in FIG. 5 by those components within the inner dashed line.

The computing device 300 can have additional features or functionality, and additional interfaces to facilitate communications between basic configuration 302 and any other devices and interfaces. For example, a bus/interface controller 330 can be used to facilitate communications between the basic configuration 302 and one or more data storage devices 332 via a storage interface bus 334. The data storage devices 332 can be removable storage devices 336, non-removable storage devices 338, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data. The term "computer readable storage media" or "computer readable storage device" excludes propagated signals and communication media.

The system memory 306, removable storage devices 336, and non-removable storage devices 338 are examples of computer readable storage media. Computer readable storage media include, but not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by computing device 300. Any such computer readable storage media can be a part of computing device 300. The term "computer readable storage medium" excludes propagated signals and communication media.

The computing device 300 can also include an interface bus 340 for facilitating communication from various interface devices (e.g., output devices 342, peripheral interfaces 344, and communication devices 346) to the basic configuration 302 via bus/interface controller 330. Example output devices 342 include a graphics processing unit 348 and an audio processing unit 350, which can be configured to communicate to various external devices such as a display or speakers via one or more A/V ports 352. Example peripheral interfaces 344 include a serial interface controller 354 or a parallel interface controller 356, which can be configured to communicate with external devices such as input devices (e.g., keyboard, mouse, pen, voice input device, touch input device, etc.) or other peripheral devices (e.g., printer, scanner, etc.) via one or more I/O ports 358. An example communication device 346 includes a network controller 360, which can be arranged to facilitate communications with one or more other computing devices 362 over a network communication link via one or more communication ports 364.

The network communication link can be one example of a communication media. Communication media can typically be embodied by computer readable instructions, data structures, program modules, or other data in a modulated data signal, such as a carrier wave or other transport mechanism, and can include any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), microwave, infrared (IR) and other wireless media. The term computer readable media as used herein can include both storage media and communication media.

The computing device 300 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. The computing device 300 can also be implemented as a personal computer including both laptop computer and non-laptop computer configurations.

From the foregoing, it will be appreciated that specific embodiments of the disclosure have been described herein for purposes of illustration, but that various modifications may be made without deviating from the disclosure. In addition, many of the elements of one embodiment may be combined with other embodiments in addition to or in lieu of the elements of the other embodiments. Accordingly, the technology is not limited except as by the appended claims.

We claim:

1. A method for processing traces from multiple data sources in a computing system, the traces individually including data representing multiple events with corresponding timestamps, the method comprising:

receiving a user input to align a first event from a first trace to a second event from a second trace and to align a third event from the first trance to a fourth event from the second trace;

in response to receiving the user input,
calculating an offset between times contained in the timestamps of the first event and the second event;
calculating first and second differences between times in timestamps of the third and fourth events relative to a base time of the first event, respectively;
deriving a ratio between the first difference and the second difference; and
generating a composite transformation incorporating both the calculated offset and the ratio between the first difference and the second difference, wherein generating the composite transformation includes calculating a new time ($T_{new}$) for the individual events of the second trace based on an original time ($T_{original}$) for the corresponding individual events, the base time ($T_{base}$), and the derived ratio (R); and applying the generated composite transformation to the events of the second trace to generate new timestamps for the events of the second trace such that the first and second events and the third and fourth events are temporally aligned, respectively; and outputting, on a display of the computing system, graphical interface elements individually corresponding to the events in the first and second traces according to the generated new timestamps for the events of the second trace along a single timeline, the graphical interface elements corresponding to the first and second events and the third and fourth events are represented on the display as being occurring at same time, respectively.

2. The method of claim 1 wherein calculating the new time for the individual events of the second trace includes calculating the new time as follows:

$$T_{new}=((T_{original}-\text{offset})-T_{base})*R+T_{base}.$$

3. The method of claim 1 wherein receiving the user input to align includes:
   detecting a user input to drag the graphical user element corresponding to the second event on the display to a location corresponding to a time approximately equal to a time of the first event; or
   detecting another user input to select the graphical user elements corresponding to the first and second events on the display and a user command to align the selected first and second events.

4. A method for processing traces from multiple data sources in a computing system, the traces individually including data representing multiple events with corresponding timestamps, the method comprising:
   receiving a user command to align a first event from a first trace to a second event from a second trace, the first trace having a first anchor event temporally aligned with a second anchor event of the second trace;
   in response to receiving the user command,
      setting a time in a timestamp of the first anchor event as a base time;
      calculating first and second differences between times in timestamps of the first and second events relative to the base time, respectively;
      deriving a ratio between the first difference and the second difference; and
      scaling time intervals between adjacent events of the second trace using the derived ratio such that the second event from the second trace is temporally aligned with the first event of the first trace while the first and second anchor events remain temporally aligned, wherein scaling the time intervals includes calculating a new time ($T_{new}$) for the individual events of the second trace based on an original time ($T_{original}$) for the corresponding individual events, the base time ($T_{base}$), and the derived ratio (R); and
   outputting, on a display of the computing system, graphical interface elements each corresponding to the events in the first and second traces according to the scaled time intervals along a single timeline, the graphical interface elements corresponding to the first and second anchor events and the first and second events are represented on the display as being temporally aligned, respectively.

5. The method of claim 4, further comprising prior to receiving the user command to align the first event from the first trace to the second event from the second trace, aligning the first and second anchor events in response to another user command.

6. The method of claim 5 wherein aligning the first and second anchor events includes:
   calculating an offset between times contained in the timestamps of the first anchor event and the second anchor event;
   applying the calculated offset to timestamps of additional events in the second trace to derive new timestamps for the additional events of the second trace; and
   outputting, on the display of the computing system, the graphical interface elements each corresponding to the events in the first and second traces according to the derived new timestamps of the second trace along the single timeline, the graphical interface elements corresponding to the first and second anchor events are represented on the display as being temporally aligned while the graphical interface elements corresponding to the first and second events are represented on the display as being not temporally aligned.

7. The method of claim 5 wherein aligning the first and second anchor events includes:
   detecting a user input to drag the graphical user element corresponding to the second anchor event on the display to a location corresponding to a time approximately equal to a time of the first anchor event; or
   detecting another user input to select the graphical user elements corresponding to the first and second anchor events on the display and another user command to align the selected first and second anchor events; and
   in response to detecting the user input, aligning the first and second anchor events.

8. The method of claim 4 wherein calculating the new time for the individual events of the second trace includes calculating the new time as follows:

$$T_{new}=(T_{original}-T_{base})*R+T_{base}.$$

9. The method of claim 4 wherein scaling time intervals includes scaling the time intervals the events of the second trace that are currently outputted as the graphical interface elements on the display while not scaling time intervals of additional events of the second trace not currently outputted as graphical interface elements on the display.

10. The method of claim 4 wherein scaling time intervals includes:
    receiving a user input selecting a beginning time and an end time for scaling time intervals; and
    in response to receiving the user input, performing the setting, calculating, deriving, and scaling operations to a subset of events of the second trace having corresponding times between the beginning time and the end time according to the corresponding timestamps.

11. The method of claim 4 wherein scaling time intervals further includes performing the setting, calculating, deriving, and scaling operations to events of a third trace designated as a group member in a group with the second trace even though the received user command is to align the first event from the first trace to the second event from the second trace.

12. The method of claim 4, further comprising:
    prior to receiving the user command to align the first event from the first trace to the second event from the second trace,
       receiving a user input to align the first and second anchor events;

in response to receiving the user input, calculating an offset between times contained in the timestamps of the first anchor event and the second anchor event; and in response to receiving the user command, deriving a composite transformation for the timestamps of the second trace based on both the calculated offset and the ratio between the first difference and the second difference and caching the derived composite transformation for application to additional events of the second trace.

13. A computing system, comprising:

a processor;

a display; and a memory operatively coupled to the processor and display, the memory having instructions executable by the processor to cause the computing system to:

output, on the display, graphic interface elements each corresponding to events in a first trace and a second trace individually have data representing the events with corresponding timestamps along a single timeline, the first trace having a first anchor event temporally aligned with a second anchor event of the second trace;

upon receiving a user command to align a first event from a first trace to a second event from a second trace, set a time in a timestamp of the first anchor event as a base time;

derive first and second differences between times in timestamps of the first and second events relative to the base time, respectively;

determine a ratio between the first difference and the second difference; and scale time intervals between adjacent events of the second trace using the derived ratio such that the second event from the second trace is temporally aligned with the first event of the first trace while the first and second anchor events remain temporally aligned, wherein scaling the time intervals includes calculating a new time ($T_{new}$) for the individual events of the second trace based on an original time ($T_{original}$) for the corresponding individual events, the base time ($T_{base}$), and the derived ratio (R); and rearrange, on the display, the graphical interface elements corresponding to the events in the first and second traces according to the scaled time intervals along the single timeline, the rearranged graphical interface elements corresponding to the first and second events appear on the display as being temporally aligned.

14. The computing system of claim 13 wherein the memory has additional instructions executable by the processor to cause the computing device to align the first and second anchor events in response to another user command prior to receiving the user command to align the first event from the first trace to the second event from the second trace.

15. The computing system of claim 14 wherein to align the first and second anchor events includes to:

calculate an offset between times contained in the timestamps of the first anchor event and the second anchor event; and apply the calculated offset to timestamps of additional events in the second trace to derive new timestamps for the additional events of the second trace.

16. The computing system of claim 14 wherein calculating the new time for the individual events of the second trace includes calculating the new time as follows:

$$T_{new}=(T_{original}-T_{base})*R+T_{base}.$$

17. The computing system of claim 14 wherein to scale time intervals includes to scale the time intervals the events of the second trace that are currently outputted as the graphical interface elements on the display while not scaling time intervals of additional events of the second trace not currently outputted as graphical interface elements on the display.

18. The computing system of claim 14 wherein to scale time intervals includes to:

receive a user input selecting a beginning time and an end time for scaling time intervals; and in response to receiving the user input, to set, derive, determine, and scale to a subset of events of the second trace having corresponding times between the beginning time and the end time according to the corresponding timestamps.

19. The computing system of claim 14 wherein to scale time intervals further includes to set, derive, determine, and scale events of a third trace designated as a group member in a group with the second trace even though the received user command is to align the first event from the first trace to the second event from the second trace.

20. The computing system of claim 14 wherein the memory has additional instructions executable by the processor to cause the computing device to:

prior to receiving the user command to align the first event from the first trace to the second event from the second trace, receive a user input to align the first and second anchor events;

in response to receiving the user input, calculate an offset between times contained in the timestamps of the first anchor event and the second anchor event; and in response to receiving the user command, derive a composite transformation for the timestamps of the second trace to incorporate both the calculated offset and the ratio between the first difference and the second difference and caching the derived composite transformation for application to additional events of the second trace.

* * * * *